No. 644,118. Patented Feb. 27, 1900.
W. L. WILEY.
DEVICE FOR BINDING CORN SHOCKS.
(Application filed June 2, 1899.)
(No Model.)
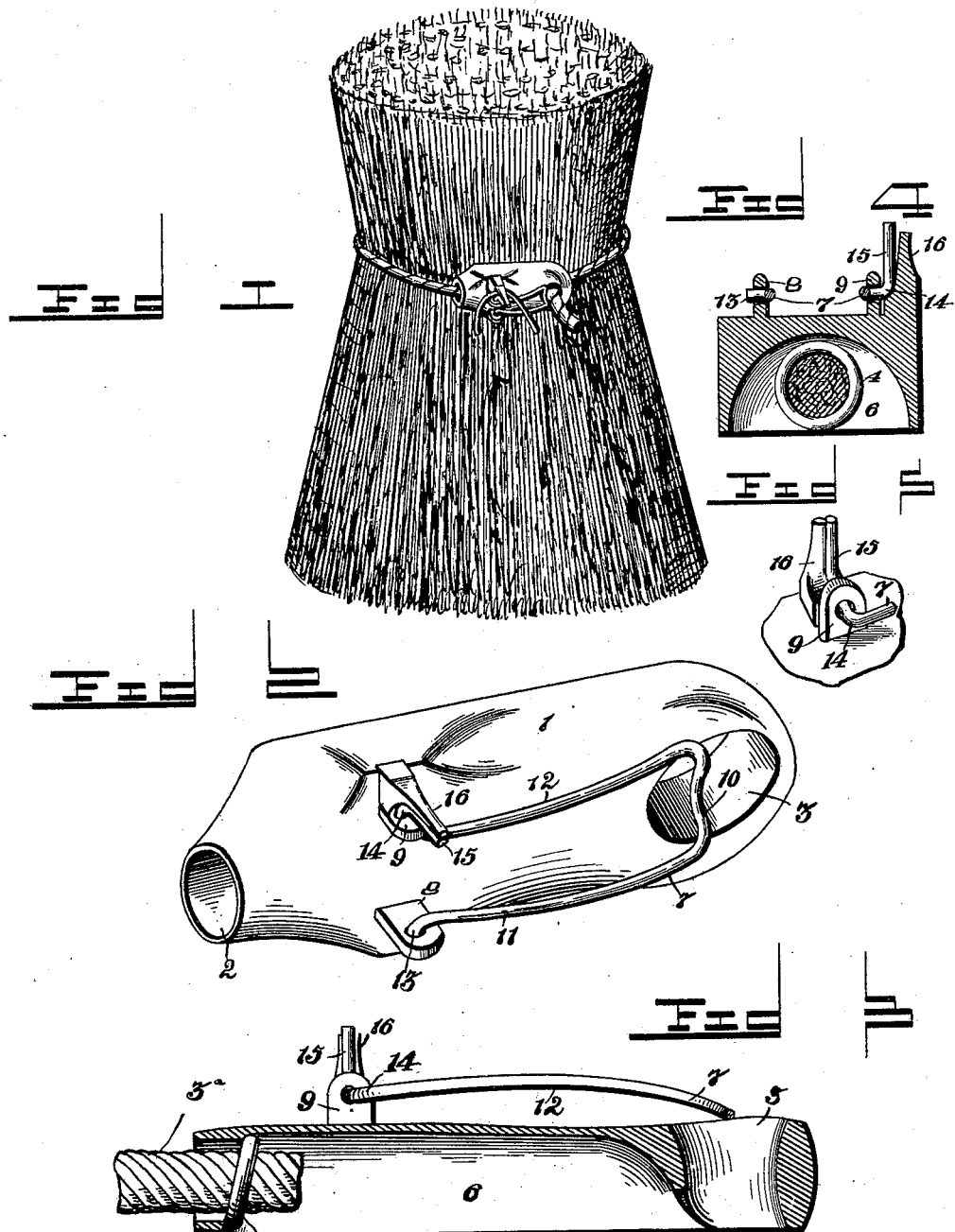
Witnesses
John Maupin
W. L. Wiley
W. L. Wiley Inventor
By his Attorneys,
C. A. Snow & Co.

UNITED STATES PATENT OFFICE.

WILLIAM L. WILEY, OF CASTANA, IOWA.

DEVICE FOR BINDING CORN-SHOCKS.

SPECIFICATION forming part of Letters Patent No. 644,118, dated February 27, 1900.

Application filed June 2, 1899. Serial No. 719,129. (No model.)

*To all whom it may concern:*

Be it known that I, WILLIAM L. WILEY, a citizen of the United States, residing at Castana, in the county of Monona and State of Iowa, have invented a new and useful Device for Binding Corn-Shocks, of which the following is a specification.

The invention relates to improvements in devices for binding corn-shocks.

The objects of the present invention are to improve the construction of devices for binding corn-shocks, and to provide a simple, inexpensive, and efficient device capable of enabling a shock of corn to be readily compressed and held while it is being bound with twine or other suitable binding material and adapted to hold one end of the twine while the same is being passed around the shock.

The invention consists in the construction and novel combination and arrangement of parts hereinafter fully described, illustrated in the accompanying drawings, and pointed out in the claims hereto appended.

In the drawings, Figure 1 is a perspective view of a device constructed in accordance with this invention and shown applied to a corn-shock. Fig. 2 is a detail perspective view of the device, the rope being removed. Fig. 3 is a longitudinal sectional view. Fig. 4 is a transverse sectional view. Fig. 5 is a detail perspective view illustrating the construction for holding the ends of a piece of twine or other material for binding the shock.

Like numerals of reference designate corresponding parts in all the figures of the drawings.

1 designates a bar or body provided at one end with a socket 2 and having an eye 3 at its other end, and the said socket receives one end of a rope 3ª, which is swiveled to the body by a ring 4 or other suitable stop secured to the rope and arranged within the body, as clearly illustrated in Fig. 3 of the accompanying drawings. The body is provided with a longitudinal groove 6, which extends inward from the socket, and the latter consists of a longitudinally-disposed eye or opening. The eye or opening 3, which receives the free end of the rope, is disposed transversely of the body, as clearly shown in Fig. 3.

The rope for temporarily binding the shock and for compressing it while it is being bound with twine is preferably about eight feet long, and it is placed around the shock, as illustrated in Fig. 1 of the drawings, its free end being drawn through the eye 3 until the shock is compressed to the desired extent. The rope is secured by a dog 7, constructed of wire or other suitable material and hinged to the outer face of the body, which is provided with perforated ears 8 and 9.

The wire dog, which is substantially U-shaped, is provided at its transverse portion 10, which engages the rope, with a slight curve or bend to present a concave face to the said rope, and it is capable of securely holding the same at any desired adjustment. The sides 11 and 12 of the dog are resilient and have their terminals bent outward to form pintles 13 and 14, which are arranged in the perforations of the ears 8 and 9, whereby the dog is hinged to the body. The side 12, which is provided with the pintle 14, is extended to form an arm 15, arranged approximately at right angles to the length of the dog and located adjacent to a lug or arm 16, which is rigid with the body and which is located at one side thereof, as clearly shown in Fig. 4.

After the shock is bound by the rope one end of the twine is placed between the rigid lug or arm 16 of the body and the yielding arm 15 of the dog, and it is securely clamped in such position while it is being passed around the shock. After the twine is tied the device is removed from the shock and another one is operated on in the same manner.

The invention has the following advantages: The device, which is simple and comparatively inexpensive in construction, possesses great strength and durability, and the swivel connection between the rope and the body will prevent the rope from kinking. The dog, which secures the device at the desired adjustment, also operates to hold the free end of the twine, and as it is designed to be constructed of steel wire it forms an efficient spring catch or clamping device.

Changes in the form, proportion, size, and the minor details of construction within the scope of the appended claims may be resorted to without departing from the spirit or sacrificing any of the advantages of this invention.

What is claimed is—

1. A device of the class described comprising a body provided at one end with a socket and having a transverse eye arranged at right angles to the socket, said body being provided on its exterior with ears, and a substantially-U-shaped pawl extending longitudinally of the body and hinged to the ears and extending to the transverse eye, whereby it is adapted to engage a rope passed through the said eye, substantially as described.

2. A device of the class described comprising a body having an eye and designed to be connected to a rope, said body being provided with a fixed lug, and a resilient dog adapted to engage the rope and arranged contiguous to and coöperating with the said lug to form a clamp for holding a piece of twine or the like, substantially as described.

3. A device of the class described comprising a body having an eye, and a resilient dog adapted to engage a rope passed through the eye, said dog forming a clamp and adapted to hold a piece of twine between it and the body, substantially as and for the purpose described.

4. A device of the class described comprising a body designed to be connected with a rope, an arm fixed to the body, and a resilient substantially-U-shaped dog arranged to engage a rope and having its sides hinged to the body, one of its sides being extended and forming an arm located adjacent to the fixed arm and adapted to clamp a piece of twine, substantially as described.

5. A device of the class described comprising a body provided with perforated ears and having a fixed arm or lug located adjacent to one of the ears, and a substantially-U-shaped resilient dog adapted to engage the rope and having its terminals bent outward to form pintles to engage the perforations to the ears, one of the terminals of the dog being extended and forming an arm located between the arm or lug and the adjacent ear, substantially as described.

6. A device of the class described, comprising a body provided with an arm or lug and adapted to be connected to a rope, and a resilient dog adapted to engage the rope and having sides hinged to the body, one of the sides being provided with an arm or extension coöperating with the lug or arm of the body to form a clamp, substantially as described.

In testimony that I claim the foregoing as my own I have hereto affixed my signature in the presence of two witnesses.

WILLIAM L. WILEY.

Witnesses:
W. T. DAY,
E. M. HUTCHINSON.